March 15, 1949.  D. I. GANTZ  2,464,444
PIPE ELBOW MARKING DEVICE
Filed Aug. 30, 1946
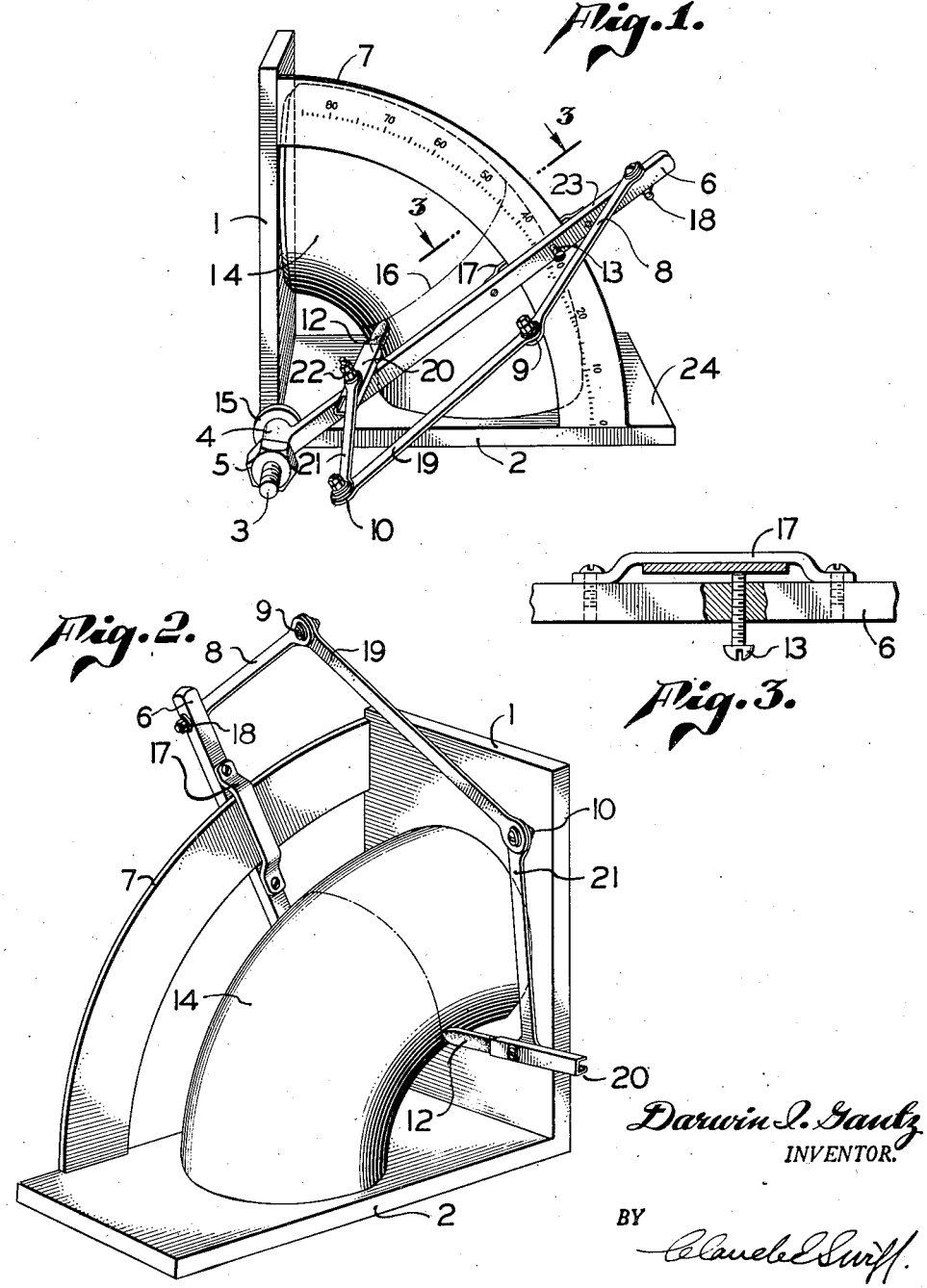
Darwin I. Gantz
INVENTOR.
BY
Claude E. Swift
ATTORNEY Patented Mar. 15, 1949

2,464,444

UNITED STATES PATENT OFFICE 2,464,444

PIPE ELBOW MARKING DEVICE

Darwin I. Gantz, Wilmington, Calif.

Application August 30, 1946, Serial No. 693,931

3 Claims. (Cl. 33—21)

This invention relates to a scriber. More specifically the invention relates to a mechanism for marking pipe ells.

Figure 1 represents a pictorial projection of a side view of the scriber.

Figure 2 represents a pictorial projection of an end view of the apparatus, and

Figure 3 represents a view of the locking mechanism of the arm 6 which rotates about the pin 3.

Referring more particularly to Figure 1 the two base plates 1 and 2 are fitted and joined together to form a 90 degree angle. The pin or bolt 3 is centered to the apex of the angle formed by the two plates 1 and 2.

The indicating arm 6 is fastened to a sleeve 4 which slides over the bolt or pin 3 and rests on washer 15. This sleeve is held on the bolt or pin 3 by means of the nut 5.

The arcuate member 7 is fastened to the base members 1 and 2 as shown in Figures 1 and 2. This member is provided with an appropriate scale to designate any angle between zero and ninety degrees.

The arm 6 rests on the face of the scale on arcuate member 7 and is held against the face of the scale plate by the yoke 17. Arm 6 is further provided with a lock screw 13 which when screwed against the face of the indicating scale holds the arm 6 in any desired position.

The jointed arms 8, 19 and 21 are held to the indicating side of the arm 6 by means of the bolt 18. Bolts 9 and 10 hold the three segments 8, 19 and 21 together.

To the free end of the member 21 there is attached the chalk or soapstone holder 20 which carries the piece of soapstone or chalk 12.

The flexible arm formed by the three members 8, 19, 21 and the soapstone or chalk 12 in carrier 20 is so constructed or assembled so that the movement of the marking point or end of the soapstone is always in the same plane as the indicating side of the arm 6. In other words, as the angles between the arm 6 and the members 8, 19, 21 and 20 are varied by rotation of the foregoing members about the connecting bolts 18, 9, 10 and 22 the point of the marking medium 12 is always in the same plane as the indicating side of arm 6 which is designated by the numeral 23. When the arm 6 is lowered and 23 becomes flush with the upper face of plate 2, designated by figure 24, the upper face 23 is then in the zero position on the indicating scale positioned on member 7.

In the operation of the mechanism the pipe ell or tube turn is placed with one face flush with plate 1 and with the other face flush with plate 2, as shown in the two figures.

The indicating arm 6 is then moved to the desired degree on the indicating scale positioned on member 7 and locked in place by screwing down screw 13 against the face of the scale plate.

The point of the soapstone in the soapstone holder 20 is then brought down against the pipe 14 and scribed around one side after which the jointed arm is then reversed over to the opposite side of the pipe and the scribing of the pipe is completed with the soapstone point. The line produced by the point of the soapstone in holder 20 as it moves around the pipe 14 is indicated by numeral 16.

I claim:

1. A scribing mechanism for marking pipe ells and the like which comprises two base plates joined at an angle of 90°, a scaled arcuate member positioned between said two base plates, a movable arm with one end rotatably fixed to the apex of the angle formed by the said two base plates, means for securing said arm to said arcuate member, and a jointed member connected to the free end of said arm, said jointed member being provided with a marking means on the free end thereof.

2. A scribing mechanism for marking pipe ells and the like which comprises two base plates joined at an angle of 90°, a scaled arcuate member positioned between said two base plates, a movable arm having one end rotatably fixed to the apex of the angle formed by the two base plates, means for securing said arm to the arcuate member having said scale and a jointed member connected to the free end of said arm, said jointed member being provided with marking means.

3. A scribing mechanism for marking pipe ells and the like which comprises two base plates joined at an angle of 90°, a scaled arcuate member positioned between the said two base plates, a movable arm rotatably fixed to the apex of the angle formed by said base plates, means for securing said arm to said arcuate member, a member connected to the free end of said arm, said member being provided with a marker the point of which is movable in a plane passing through the apex of the 90° angle formed by the said two base plates.

DARWIN I. GANTZ.

REFERENCES CITED

The following references are of record in the file of this patent:

UNITED STATES PATENTS

| Number | Name | Date |
|---|---|---|
| 1,991,117 | Porteous et al. | Feb. 12, 1935 |
| 2,095,479 | Ridgeway | Oct. 12, 1937 |